(12) United States Patent
Dar-Tson

(10) Patent No.: US 7,097,313 B2
(45) Date of Patent: Aug. 29, 2006

(54) FLIP-FLOP DIAGONAL WITH VARIABLE ANGLES

(76) Inventor: Shen Dar-Tson, No. 89, Lane 4, Chia An W. Rd., Long Tan, Tao Yuan, Taiwan (CN)

( * ) Notice: Subject to any disclaimer, the term of this patent is extended or adjusted under 35 U.S.C. 154(b) by 9 days.

(21) Appl. No.: 10/760,097

(22) Filed: Jan. 16, 2004

(65) Prior Publication Data

US 2005/0063053 A1    Mar. 24, 2005

(30) Foreign Application Priority Data

Sep. 19, 2003    (CN)    ................................ 03151070

(51) Int. Cl.
*G02B 7/182*    (2006.01)
(52) U.S. Cl. ...................... 359/872; 359/402; 359/405; 359/873
(58) Field of Classification Search ................ 359/402, 359/405, 871–883
See application file for complete search history.

(56) References Cited

U.S. PATENT DOCUMENTS

| | | |
|---|---|---|
| 3,637,315 A | 1/1972 | Harper |
| 3,782,808 A | 1/1974 | Hohl et al. |
| 3,881,804 A | 5/1975 | Ikeda |
| 3,951,511 A | 4/1976 | Parsons |
| 3,966,298 A | 6/1976 | Chapman |
| 4,221,459 A | 9/1980 | Fisher |
| 4,264,122 A | 4/1981 | Schmidt et al. |
| 4,444,474 A | 4/1984 | Pasko |
| 4,684,224 A | 8/1987 | Yamashita et al. |
| 4,859,045 A | 8/1989 | Dagan et al. |
| 4,927,252 A | 5/1990 | Burr |
| 5,121,220 A * | 6/1992 | Nakamoto ................... 359/419 |
| 5,124,844 A | 6/1992 | Wraight |
| 5,134,519 A | 7/1992 | Abele et al. |
| 6,031,662 A | 2/2000 | Miller et al. |
| 6,064,520 A | 5/2000 | Nowak et al. |
| 6,097,555 A | 8/2000 | Lehmann et al. |
| 6,330,117 B1 | 12/2001 | Seo |
| 6,511,192 B1 | 1/2003 | Henion et al. |
| 6,542,297 B1 * | 4/2003 | Lee et al. ................... 359/466 |
| 2001/0022686 A1 | 9/2001 | Haran |

(Continued)

FOREIGN PATENT DOCUMENTS

DE    39 30 353 A1    3/1991

(Continued)

*Primary Examiner*—Drew A. Dunn
*Assistant Examiner*—Joshua L. Pritchett
(74) *Attorney, Agent, or Firm*—Dorsey & Whitney, LLP

(57) ABSTRACT

The present invention provides a flip-flop diagonal with variable viewing angles. It comprises a housing body, an eyepiece adapter unit and a reflective mirror unit. The housing body has a cylindrical sleeve for mounting the diagonal to a telescope. The eyepiece adapter unit includes an eyepiece adapter and an eyepiece support frame, the eyepiece adapter is fixed on the eyepiece support frame, the eyepiece support frame is pivotably mounted on the housing body. The reflective mirror unit includes a reflective mirror, a mirror support bracket and rotary shafts, the reflective mirror is mounted in the mirror support bracket, and the mirror support bracket is pivotally mounted on the eyepiece support frame through the rotary shafts. With the flip-flop diagonal according to the present invention, when observing the sky through the refracting astronomical telescope, wherever the target is, the eyepiece can be located in different positions only by changing the angles of the eyepiece adapter. Therefore, the number of the telescope accessories can be reduced, and, on the other hand, the observation is more convenient.

10 Claims, 1 Drawing Sheet

U.S. PATENT DOCUMENTS

2003/0184858 A1 * 10/2003 Kung .................. 359/402

FOREIGN PATENT DOCUMENTS

| DE | 44 26 224 A1 | 4/1996 |
|----|--------------|--------|
| DE | 100 08 228 A1 | 8/2001 |
| EP | 0 126 826 A1 | 12/1984 |
| EP | 0 152 056 A2 | 8/1985 |
| EP | 0 217 442 A1 | 4/1987 |
| EP | 0 270 338 A2 | 6/1988 |
| EP | 0 598 950 A1 | 6/1994 |
| EP | 0 887 680 A1 | 12/1998 |
| EP | 1 258 744 A1 | 11/2002 |
| EP | 1 279 987 A2 | 1/2003 |
| FR | 2 558 969 | 2/1985 |
| GB | 2 318 423 A | 4/1998 |
| JP | 08076020 A | 3/1996 |
| JP | 2001-91865 | 4/2001 |
| WO | WO 03/023485 | 3/2003 |

* cited by examiner

… (1)

FLIP-FLOP DIAGONAL WITH VARIABLE ANGLES

CROSS-REFERENCE TO RELATED APPLICATION(S)

The present application claims priority to Chinese Application No. 03151070.1, filed on Sep. 19, 2003, the contents of which is incorporated herein in its entirety by reference.

TECHNICAL FIELD

The present invention generally relates to the observation system in a refracting astronomical telescope, in particular, it relates to a flip-flop diagonal with variable observation angles.

BACKGROUND ART

When people perform astronomy observation, the position of the celestial target often rotates with respect to the refracting astronomical telescope. Therefore, the current refracting telescopes need to be equipped with a certain accessory, i.e., diagonals, which could change the optical axis orientation, thus will facilitate the observers' viewing celestial targets in different positions. At present, two kinds of diagonals with fixed angle are commonly used. One is 45°, the other is 90°, which could turn the optical axis by 45° or 90° for convenient observation. Since the viewing angle is fixed, the whole diagonal has to be changed if the observers want to change the observation angle, which will cause the problems of redundant accessories and wasting time to re-aim the target.

SUMMARY OF THE PRESENT INVENTION

In order to overcome the above-mentioned drawbacks, the present invention is aimed to provide a flip-flop diagonal with variable viewing angles, which could reach the same effect as the 45° and 90° diagonals could reach.

To achieve the above-mentioned purpose, the present invention provides a flip-flop diagonal with variable viewing angles. It comprises a housing body, an eyepiece adapter unit and a reflective mirror unit. The housing body has a cylindrical sleeve for mounting the diagonal to a telescope. The eyepiece adapter unit includes an eyepiece adapter and an eyepiece support frame, the eyepiece adapter is fixed on the eyepiece support frame, the eyepiece support frame is pivotably mounted on the housing body. The reflective mirror unit includes a reflective mirror, a mirror support bracket and rotary shafts, the reflective mirror is mounted in the mirror support bracket, and the mirror support bracket is pivotally mounted on the eyepiece support frame through the rotary shafts.

When performing astronomical observations through a refracting telescope, with the help of this flip-flop diagonal, wherever the observing target is, the refractor can be viewed through at least two different positions (for example, 90° or 45°) by changing the rotation angle of the diagonal. Thus, it achieves the same effects as those with the two fixed-angle diagonals. Therefore, by using this flip-flop diagonal, the number of telescope accessories could be reduced, while the observation could be more convenient and more effective.

The following descriptions with reference to the figures will make the purposes, advantages and the features of this invention clearer.

EMBODIMENTS

Figure 1:
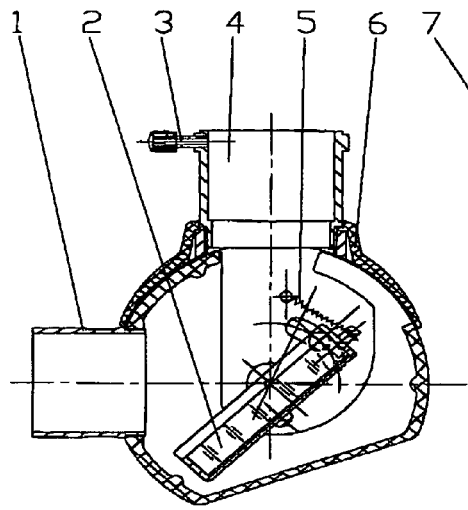
FIG. 1 is a sectional view of a flip-flop diagonal of a preferred embodiment according to the present invention, in which the eyepiece adapter is located at the 90° observation position with respect to the telescope axis.
Figure 2:
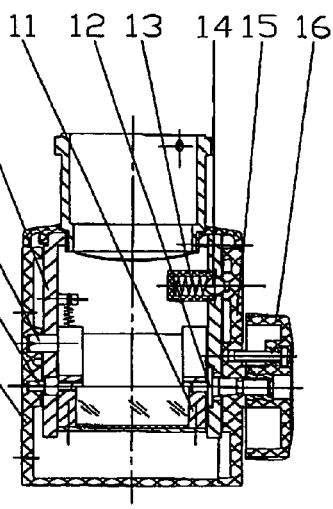
FIG. 2 is a side view of the flip-flop diagonal, the observation position is the same as that of FIG. 1.

The flip-flop diagonal of the present invention mainly comprises a housing body, an eyepiece adapter unit, and a reflective mirror unit. Their structures will be described in details with reference to the figures as follows.

The housing body includes a seat body 7, an upper cover plate 6 and a side cover plate 15. A cylindrical sleeve 1 for mounting the flip-flop diagonal to the telescope is provided on the seat body 7. The seat body 7 and the side cover plate 15 are connected to each other, for example, by means of screws. The upper cover plate 6 is connected to the eyepiece support frame 10, and can rotate together with the frame 10 with respect to seat body 7. As is shown by the dotted lines in FIG. 3, a first arc groove is provided on a side wall of the housing body, and the function thereof will be described later.

It should be understood that the housing body is not limited to the structure constituted by the seat body 7, the upper cover late 6 and the side cover plate 15, the structure can be constituted in other various ways. For example, the upper cover 6 can be removed, or a front and a rear cover plate can be provided, and so on.

The eyepiece adapter unit includes an eyepiece adapter 4 and an eyepiece support frame 10. When viewing the sky, the eyepiece is put in the eyepiece adapter 4, and is fixed by a screw 3. The eyepiece adapter 4 is fixed to the eyepiece support frame 10, for example, by screw threads. Meanwhile, the upper cover plate 6 is fixed in place. The eyepiece support frame 10 has two supporting arms (FIG. 3), two rotary shafts 8 and 12 which is on the mirror support bracket (to be described later) pass through respectively these two support arms. Thus, the mirror support bracket 11 is pivotally mounted on the eyepiece support frame 10. In addition, as shown in FIG. 1, a second arc groove is provided on one of the support arms, the function of this groove will be described later. The rotary shafts 8 and 12 also pass through the seat body 7 and the side cover plate 15, thereby the eyepiece support 10 is pivotably mounted on the housing body. Thus, the mirror support bracket 11 and the eyepiece support frame 10 are supported on the same shaft and hence rotate coaxially.

It should be understood that the eyepiece support frame 10 is not only limited to the structure having two support arms, it can also be constructed as other forms, such as "U" shape, "□" shape and the like.

The Reflective mirror unit includes a reflective mirror 2, a mirror support bracket 11, and rotary shafts 8 and 12. The reflective mirror 2 is mounted in the support bracket 11, and could reflect the incoming light rays to the eyepiece adapter 4. Due to the fact that the mirror support bracket 11 is pivotably mounted on the eyepiece support frame 10, the reflective mirror 2 can be changed to different positions by the aid of the rotation of the mirror support bracket 11. A restricting shaft 9 is provided on the mirror support bracket 11. This restricting shaft 9 passes through the second arc groove which is on the eyepiece support frame 10, and enters into the first arc groove which is on the housing body. When the restricting shaft 9 on the mirror support bracket 11 rotates with the mirror support bracket 11, the restricting shaft 9 rotates within the ranges of the first and second arc grooves. Thus, it restricts the rotating range of the mirror support bracket 11, and hence the rotating range of flat reflective mirror 2 is also restricted.

Besides, in the preferred embodiments, a spring 5 is used to elastically connect the eyepiece support frame 10 with the mirror support bracket 11.

Further, to be more convenient and reliable in use, an anchoring fixture and a locking fixture are provided in the preferred embodiment.

The anchoring fixture includes a steel ball 14 provided on the eyepiece support frame 10, and an anchoring hole provided in the side cover plate 15. The steel ball 14 is pressed by a spring 13, thereby always keeping contact with the side cover plate 15. When the eyepiece support frame 10 rotates to the required position, the steel ball enters into the anchoring hole, with a "click" sound, indicating that it is in place and ready to use. It should be understood that if the steel ball 14 is provided on the side cover plate, while the anchoring hole in the eyepiece support frame 10, it is also feasible. In addition, the anchoring fixture can also be mounted between the side wall of the seat body 7 and the eyepiece support frame 10.

The locking fixture mainly includes a hand knob 16. The hand knob is screwed to the outer end of the rotary shaft 12 through an inner screw thread provided in the central hole of the hand knob. When a stable positioning is needed or photography is to be taken, the knob 16 can be tightened, and hence the eyepiece support frame 10 is immovable. In addition, in order to limit the rotation angle of the hand knob, a set screw can be provided on the hand knob, and an arc restricting groove is correspondingly disposed on the side cover plate 15.

Figure 3:
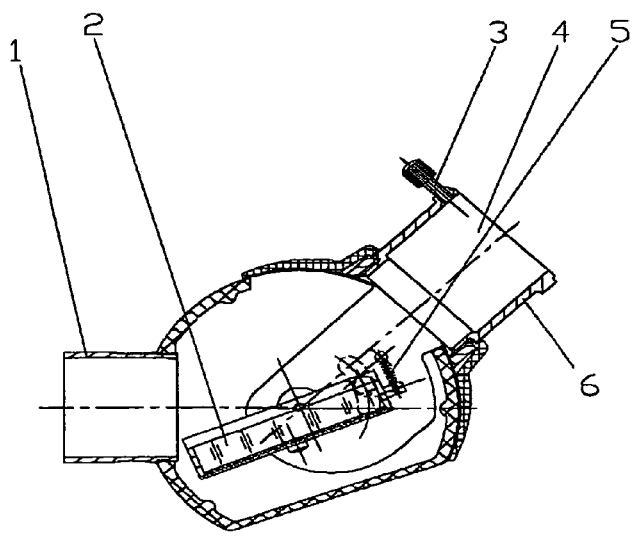
FIG. 3 is another side view of the flip-flop diagonal, in which the eyepiece adapter is located at the 45° observation position with respect to the telescope axis.

When the eyepiece adapter 4 rotates clockwise from the 90° position as shown in FIG. 1, the upper edge of the second arc groove of the eyepiece frame 10 pushes the restricting shaft 9, thereby making the reflective mirror rotate clockwise. When the eyepiece adapter 4 rotates counterclockwise from the 45° position as shown in FIG. 3, the first arc groove on the side wall of the housing body acts on the restricting shaft 9, thereby making the mirror rotate counterclockwise. When the reflective mirror rotates counterclockwise, the spring 5 is stretched, producing a pulling force on the mirror support bracket 11, thereby facilitating the counterclockwise rotation of the mirror. The range of the rotation angle of the reflective mirror is restricted by the first and second arc grooves.

Referring to FIG. 1, when the eyepiece adapter 4 is located in the 90° position, a 45° angle is formed between the reflective mirror and the optical axis. Referring to FIG. 3, when the eyepiece adapter 4 rotates from the 90° position to the 45° position, the reflective mirror clockwise rotates an angle of 22.5°, thus forming an angle of 22.5° with respect to the optical axis.

In order to guarantee that the telescope has the same eyepiece viewfield wherever it is in the 45° position or the 90° position, the flip-flop diagonal of the present invention must meet the following demands.

1. The rotary shafts 8 and 12 must be on the reflective surface of the reflective mirror 2. Also, they must intersect the optical axis of telescope and eyepiece.

2. The mirror support bracket 11 and the eyepiece support frame 10 must rotate coaxially, and the rotation angle of the mirror support bracket 11 must be one half of that of the eyepiece support frame 10.

As compared with the conventional fixed-angle diagonal, in the flip-flop diagonal with variable angle according to the present invention, there are additionally disposed the mirror support bracket, the eyepiece support frame, the rotary shafts, and some fixtures for restricting the relative movement the between eyepiece support frame and the reflective mirror support bracket. To facilitate the use, the anchoring fixture and the locking fixture are also provided.

With the above-mentioned structure, even when the eyepiece rotates by 45°, the object (target) still stays in the basically same position in the eyepiece field of vision. That is to say, although the angle of the diagonal is changed, the target to be observed can still be found in the viewfield.

Although detailed descriptions have been made with reference to the preferred embodiments, it should be understood that various equivalent changes can be made by the skilled person in the art on the basis of the above disclosure. For example, the above description takes 45° and 90° positions as examples, but it is also feasible if the other angles, such as 15°, 30°, 60°, are adopted. In addition, if required, the observations could be made at any angles in the range of 45°–90° (even in ranges beyond this). Thus, different observation angles can be obtained, and it does not need to meet the above mentioned demand on the position of the rotating shaft of the reflective mirror, and does not need to meet the demand that the mirror support bracket and the eyepiece support frame rotate coaxially. The transmission and limiting fixtures are also not always necessary. Besides, if with enough fine processing (machining) precision, the mutual contact between a notch on the upper housing body (the seat body 7) and the eyepiece support frame 10 can be used as limiting fixture. Therefore, the scope of protection for this invention shall be defined by the appended claims.

The invention claimed is:

1. A flip-flop diagonal with variable viewing angles, comprising:
   a housing body;
   an eyepiece adapter unit;
   a reflective mirror unit;
   wherein the housing body has a cylindrical sleeve for mounting the diagonal to a telescope;
   wherein the eyepiece adapter unit includes an eyepiece adapter and a pivotal eyepiece support frame, the eyepiece support frame is pivotably mounted on the housing body, the eyepiece adapter is fixed on the eyepiece support frame so that the eyepiece adapter pivots, along with the eyepiece support frame, relative to the housing body, thereby capable of changing the view angles by rotating the eyepiece adapter between different positions; and
   wherein the reflective mirror unit includes a reflective mirror, a mirror support bracket and rotary shafts, the reflective mirror is mounted in the mirror support bracket, and the mirror support bracket is pivotally mounted on the eyepiece support frame through the rotary shafts.

2. The flip-flop diagonal according to claim 1, further comprising a spring for elastically connecting the eyepiece support frame to the mirror support bracket.

3. The flip-flop diagonal according to claim 1, wherein the housing body includes a seat body, an upper cover plate and a side cover plate, the seat body is connected to the side cover plate, and the upper cover plate is connected to the eyepiece support frame.

4. The flip-flop diagonal according to claim 1, further comprising a transmission and limiting fixture including a first arc groove provided on the side wall of the housing body, a second arc groove provided on the eyepiece support frame, and a restricting shaft provided on the mirror support bracket.

5. The flip-flop diagonal according to claim 1, further comprising another transmission and limiting fixture including a notch on the housing body and the eyepiece support frame.

6. The flip-flop diagonal according to claim 1, further comprising an anchoring fixture, a steel ball and an anchoring hole, wherein the anchoring fixture is provided between the eyepiece support frame and the housing body.

7. The flip-flop diagonal according to claim 1, further comprising a locking fixture including a hand knob; which is screwed to the rotary shafts.

8. The flip-flop diagonal according to claim 1, wherein the rotary shafts are located on a reflecting surface of the reflective mirror and intersects an axis of the telescope and an eyepiece.

9. The flip-flop diagonal according to claim 1, wherein the mirror support bracket and the eyepiece support frame rotate coaxially, a rotation angle of the mirror support bracket is one half of that of the eyepiece support frame.

10. The flip-flop diagonal according to any of the preceding claims, wherein the eyepiece adapter unit can be pivoted to an angle of 45° or 90° with respect to an axis of the telescope.

* * * * *